(12) United States Patent
Gibson et al.

(10) Patent No.: US 11,204,010 B2
(45) Date of Patent: Dec. 21, 2021

(54) METHODS AND SYSTEM FOR CRANKING AN ENGINE VIA OUTPUT OF A DC/DC CONVERTER

(71) Applicant: Ford Global Technologies, LLC, Dearborn, MI (US)

(72) Inventors: Alexander O'Connor Gibson, Ann Arbor, MI (US); John Eric Rollinger, Troy, MI (US); David Hancock, Flat Rock, MI (US); William Taylor, Ypsilanti, MI (US); Mark E. Shields, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/795,865

(22) Filed: Feb. 20, 2020

(65) Prior Publication Data

US 2021/0262428 A1 Aug. 26, 2021

(51) Int. Cl.
| | |
|---|---|
| *F02N 11/08* | (2006.01) |
| *B60L 58/20* | (2019.01) |
| *B60W 10/08* | (2006.01) |
| *B60W 10/26* | (2006.01) |
| *B60L 50/16* | (2019.01) |

(52) U.S. Cl.
CPC .......... *F02N 11/0866* (2013.01); *B60L 58/20* (2019.02); *B60L 50/16* (2019.02); *B60L 2240/547* (2013.01); *B60W 10/08* (2013.01); *B60W 10/26* (2013.01); *B60W 2510/244* (2013.01); *F02N 2011/0885* (2013.01); *F02N 2011/0888* (2013.01); *F02N 2011/0896* (2013.01); *F02N 2200/063* (2013.01)

(58) Field of Classification Search
CPC ......... F02N 11/0866; F02N 2011/0896; F02N 2011/0888; F02N 2200/063; F02N 2011/0885; B60L 58/20; B60L 2240/547; B60L 50/16; B60W 2510/244; B60W 10/26; B60W 10/08
See application file for complete search history.

(56) References Cited

U.S. PATENT DOCUMENTS

| 5,343,351 | A | * | 8/1994 | Quantz | F02N 11/087 361/18 |
| 8,164,206 | B2 | * | 4/2012 | Gibson | F02N 11/0866 290/38 R |
| 10,519,917 | B2 | * | 12/2019 | Lee | F02N 11/101 |
| 2005/0068003 | A1 | * | 3/2005 | Gauthier | B60L 50/61 320/104 |
| 2005/0151509 | A1 | | 7/2005 | Cook | |

(Continued)

OTHER PUBLICATIONS

Gibson, A. et al., "Methods and System for Operating a Vehicle Having a DC/DC Converter," U.S. Appl. No. 16/709,678, filed Dec. 10, 2019, 46 pages.

*Primary Examiner* — Carl C Staubach
(74) *Attorney, Agent, or Firm* — Geoffrey Brumbaugh McCoy Russell LLP (57) ABSTRACT

A method for operating a vehicle that includes a DC/DC converter is described. In one example, the method includes adjusting an output voltage of the DC/DC converter after the DC/DC converter is used to crank an engine. The output voltage of the DC/DC converter may be adjusted responsive to a state of charge of an ultra-capacitor.

18 Claims, 6 Drawing Sheets

(56) References Cited

U.S. PATENT DOCUMENTS

| | | | |
|---|---|---|---|
| 2005/0209747 A1* | 9/2005 | Yakes | B60L 1/00 701/22 |
| 2010/0109586 A1* | 5/2010 | Matsui | H02P 29/60 318/400.04 |
| 2010/0244782 A1* | 9/2010 | Nagayama | H02J 7/0032 320/162 |
| 2013/0082521 A1* | 4/2013 | Callicoat | B60L 1/00 307/10.1 |
| 2014/0244082 A1* | 8/2014 | Caron | B60L 50/61 701/22 |
| 2016/0032880 A1* | 2/2016 | Lovett | B60K 6/547 701/22 |
| 2017/0327107 A1* | 11/2017 | Ando | B60W 30/188 |
| 2018/0258900 A1* | 9/2018 | Namuduri | F02N 15/067 |
| 2018/0306157 A1* | 10/2018 | Lee | F02N 11/04 |
| 2019/0003440 A1* | 1/2019 | Kobayashi | B60K 6/442 |
| 2019/0263274 A1* | 8/2019 | Scolari | H02M 3/1582 |
| 2019/0326772 A1* | 10/2019 | Shields | B60L 3/0069 |

* cited by examiner

FIG. 6 ns and Sys

METHODS AND SYSTEM FOR CRANKING AN ENGINE VIA OUTPUT OF A DC/DC CONVERTER

FIELD

The present description relates to methods and a system for operating a vehicle that includes a direct current to direct current (DC/DC) converter. The methods and systems may reduce engine starting time and improve the possibility of engine starting during an engine cranking period.

BACKGROUND AND SUMMARY

A vehicle may include an internal combustion engine that may be started via rotating the engine via an electric machine and supplying fuel to the engine. During many operating conditions, the electric machine may rotate the engine at a speed that facilitates combustion within the engine. The electric machine may be provided with electrical power from a low voltage bus. The low voltage bus may also distribute electrical power to other devices such as steering systems and entertainment systems. The other devices may be supplied with power via an electrical power storage device, and the electrical power storage device may be buffered from the low voltage power bus via a diode or other current limiting device. However, charge stored in the electrical power storage device that supplies electrical power to the other devices may be reduced via the other devices when the engine is being cranked. Further, it may not be desirable to charge the electrical power storage device via electrical machines that receive input from engine rotation because loading the engine during and after engine run-up may increase a possibility of engine stalling and engine emissions. Therefore, it may be desirable to provide a way of charging the electric power storage device without mechanically loading the engine immediately following engine cranking.

The inventors herein have recognized the above-mentioned issues and have developed a vehicle operating method, comprising: adjusting an output voltage of a DC/DC converter directly electrically coupled to a low voltage bus and supplying electrical power to the low voltage bus via the DC/DC converter in response to an engine start request; cranking the engine via an electric machine, the electric machine directly electrically coupled to the low voltage bus; and adjusting the output voltage of the DC/DC converter in response to a state of charge of a ultra-capacitor directly coupled to buffered electrical vehicle loads in response to completion of the cranking of the engine.

By adjusting an output voltage of a direct current to direct current (DC/DC) converter in response to a state of charge of an ultra-capacitor that is directly coupled to buffered electrical vehicle loads, it may be possible to improve engine starting and charging of devices that are coupled to the low voltage bus without increasing load on an engine during engine starting and run-up. Consequently, the possibility of engine stalling during engine run-up may be reduced. In addition, engine emissions during engine starting may be reduced. In one example, an output voltage of a DC/DC converter may be adjusted to provide additional charge to the low voltage bus via the DC/DC converter and the high voltage bus when charge of an ultra-capacitor is less than a threshold. In this way, charge that is delivered to the ultra-capacitor may be increased without loading the engine so that the possibility of the engine stalling and engine emissions increasing may be reduced.

The present description may provide several advantages. Specifically, the approach may improve engine cranking and starting. Further, the approach may reduce a possibility of engine stalling. In addition, the approach may improve electric machine torque production during engine starting to ensure that the electric machine has sufficient torque capacity to rotate the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
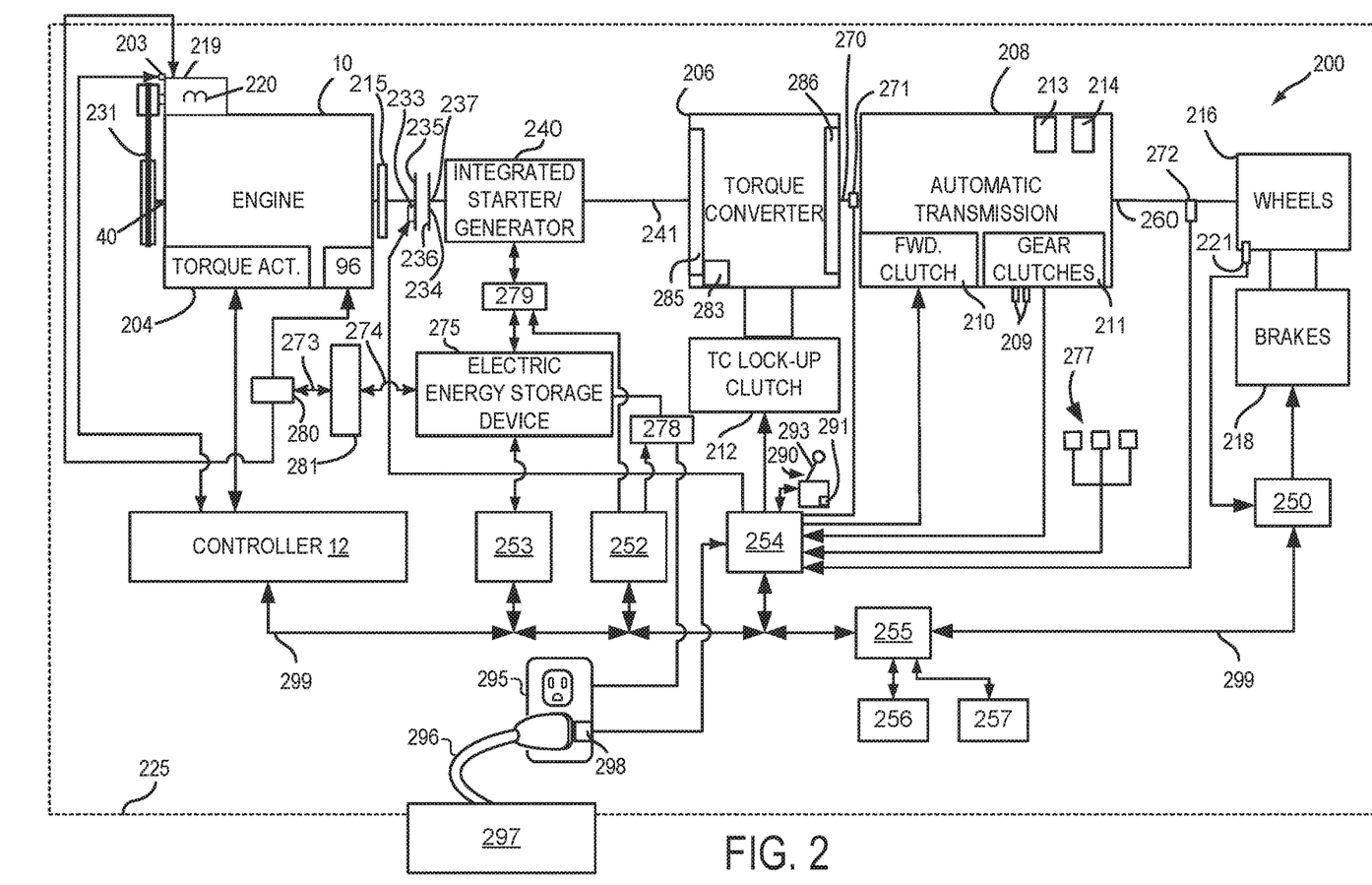
FIG. 2 shows a schematic diagram of an example vehicle driveline or powertrain including the internal combustion engine shown in FIG. 1.
Figure 3:
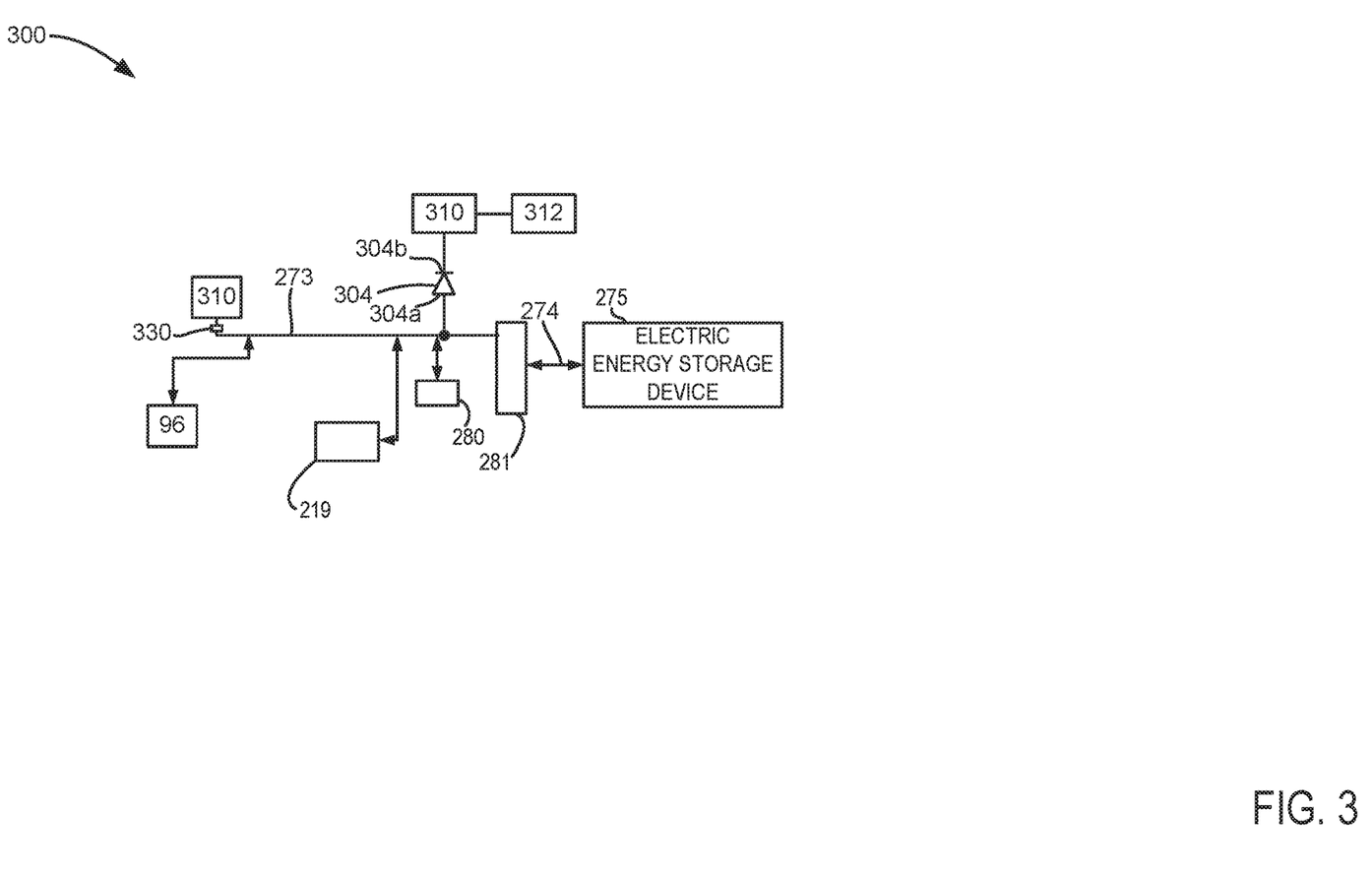
FIG. 3 shows a schematic of an example vehicle electric power system.
Figure 4:
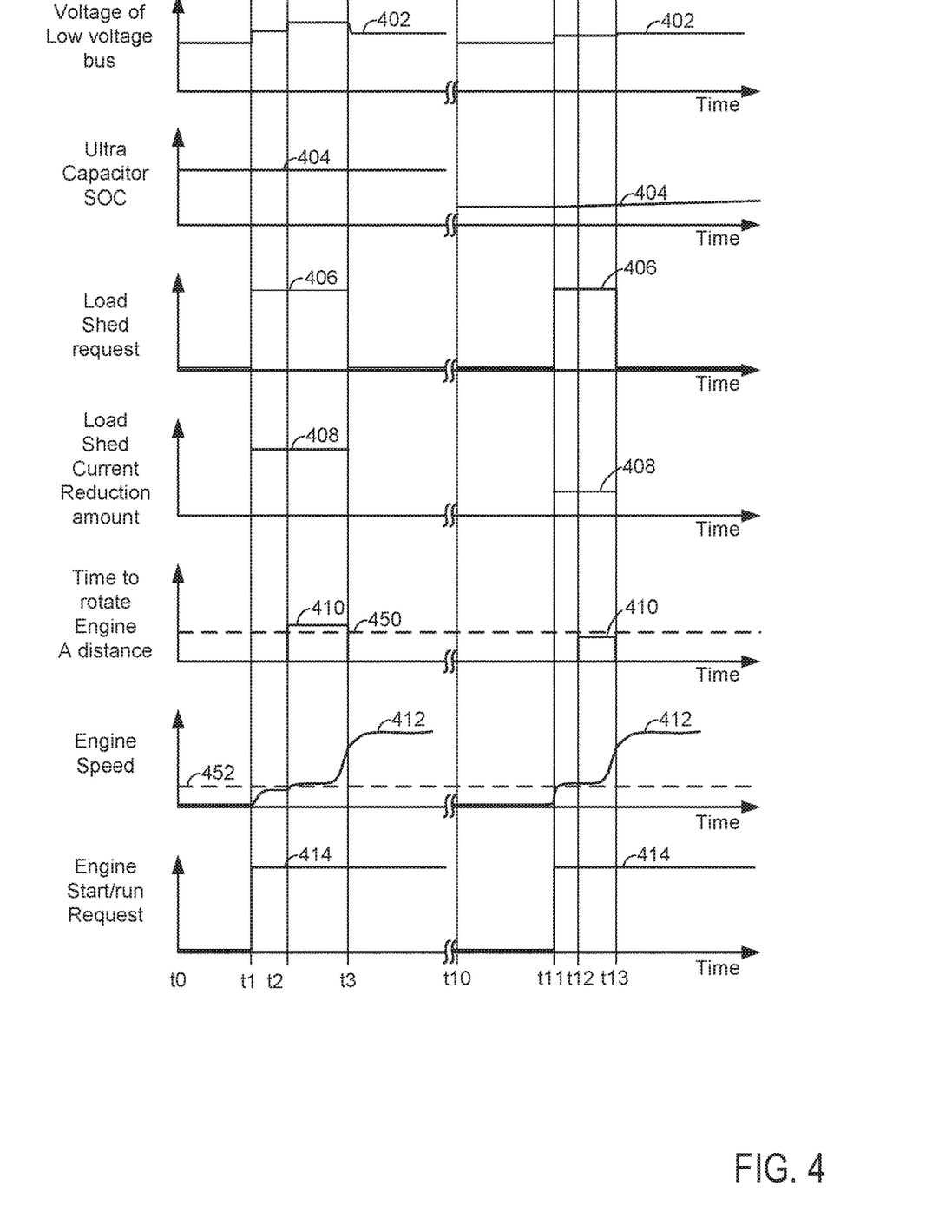
FIG. 4 shows an example vehicle operating sequence according to the method of FIG. 5.

The present description is related to operating a DC/DC converter of a vehicle. The DC/DC converter may be operated in a way that may improve engine starting and reduce engine emissions. In particular, a voltage output of the DC/DC converter may be adjusted during and immediately after engine cranking responsive to an operating state of an ultra-capacitor that supplies electrical charge to electrical power consumers that are on-board a vehicle. In particular, if a state of charge (SOC) of the ultra-capacitor is low, output voltage of the DC/DC converter may be increased to boost voltage of a low voltage bus. By increasing the voltage of the low voltage bus, the ultra-capacitor may reach a desired SOC at an earlier time. Further, output of the DC/DC converter may be adjusted responsive to vehicle operating conditions during engine cranking so that an electric machine has sufficient torque capacity to rotate the engine at a desired speed during engine cranking. By ensuring that the vehicle may be cranked (e.g., rotated via an electric machine under power of the electric machine before combustion in the engine is sufficient to rotate the engine at a predetermined speed) at a uniform speed via an electric machine, it may be possible to make engine starting time more uniform. It may also reduce the possibility of the engine stalling via reducing load that is applied to the engine during engine run-up. The engine may be an internal combustion engine of the type shown in FIG. 1, or alternatively, the engine may be a diesel engine. The engine may be integrated into a system that includes a DC/DC converter as shown in FIG. 2. The DC/DC converter may be a component of a vehicle electrical system as shown in FIG. 3. The vehicle system may operate as shown in FIG. 4 according to the method of FIG. 5. Example relationships between boost voltage and vehicle operating conditions are shown in FIG. 6.

Figure 1:
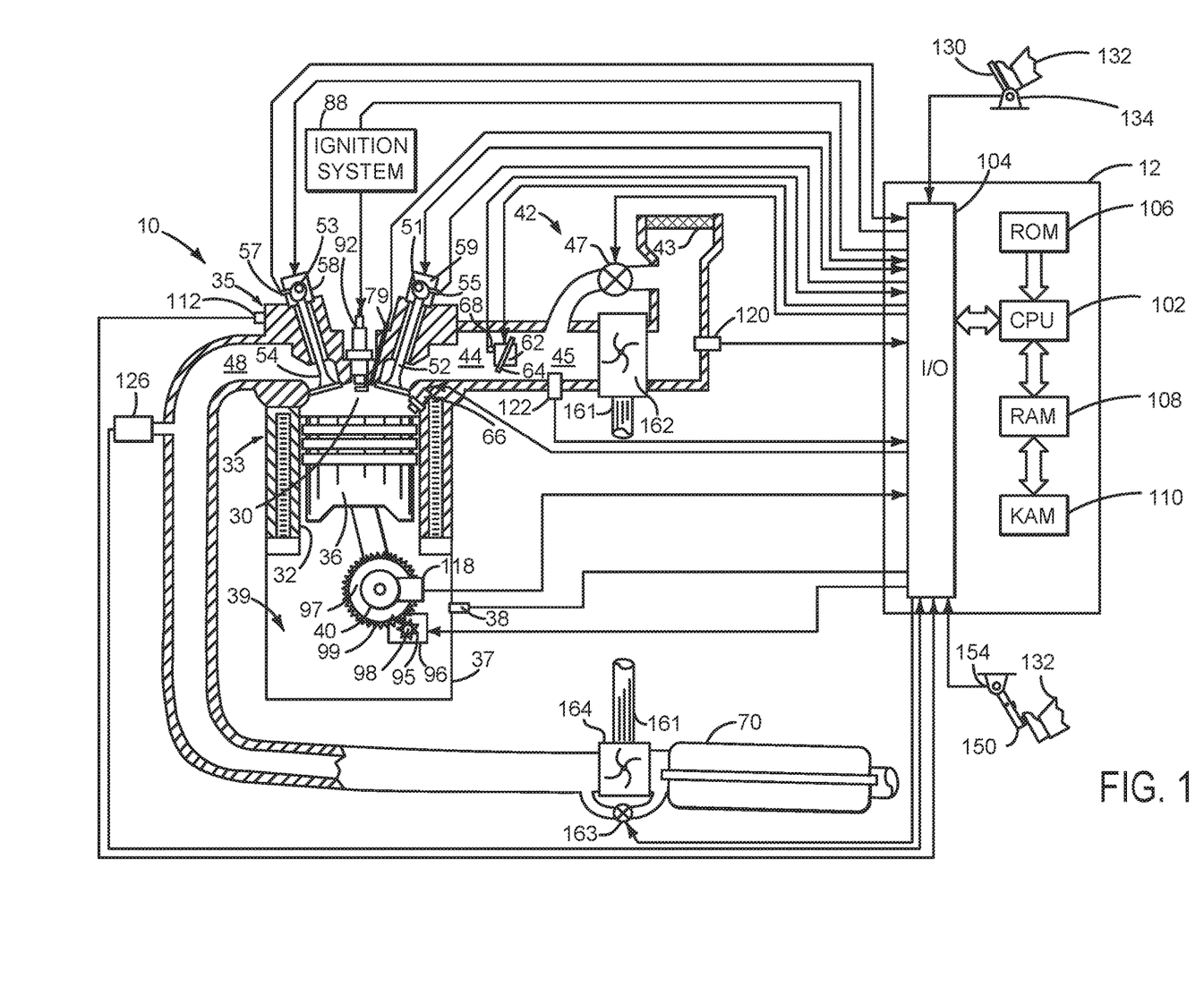
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256 and traffic conditions (e.g., traffic signal status, distance to objects, etc.) from sensors 257 (e.g., cameras, LIDAR, RADAR, etc.). In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator BISG 219, or via driveline integrated starter/generator (ISG) 240 also known as an integrated starter/generator. A temperature of BISG windings may be determined via BISG winding temperature sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231 and BISG 219 may be referred to as an electric machine, motor, or generator. BISG 219 may be coupled to crankshaft 40 or a camshaft (e.g., 51 or 53 of FIG. 1). BISG 219 may operate as a motor when supplied with electrical power via low voltage bus 273 and/or low voltage battery 280. BISG 219 may operate as a generator supplying electrical power to low voltage battery 280 and/or low voltage bus 273. Bi-directional DC/DC converter 281 may transfer electrical energy from a high voltage buss 274 to a low voltage buss 273 or vice-versa. Low voltage battery 280 is electrically directly coupled to low voltage buss 273. Low voltage bus 273 may be comprised of one or more electrical conductors. Electric energy storage device 275 is electrically coupled to high voltage buss 274. Low voltage battery 280 may selectively supply electrical energy to starter motor 96 and/or BISG 219.

An engine output power may be transmitted to a first or upstream side of powertrain disconnect clutch 235 through dual mass flywheel 215. Disconnect clutch 236 is hydraulically actuated and hydraulic pressure within driveline disconnect clutch 236 (driveline disconnect clutch pressure) may be adjusted via electrically operated valve 233. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may convert AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC 212 is locked. TCC 212 is electrically operated by controller 254. Alternatively, TCC may be hydraulically locked. In one example, the torque converter 206 may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-X (where X is an upper gear number), D (drive), neutral (N), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, an example vehicle electric power system 300 is shown. Vehicle electric power system 300 is included in vehicle 225. Vehicle electric power system 300 includes a low voltage bus 273 and a high voltage bus 274, for distributing electrical power throughout the vehicle power system 300. The low voltage bus 273 and the high voltage bus 274 may be comprised of separate electrical conductors.

Electric energy storage device 275 and DC/DC converter 281 are shown directly electrically coupled to high voltage bus 274. The DC/DC converter 281 buffers the low voltage bus 273 from high voltage bus 274. In this context, "buffered" refers to restricting or controlling current flow to or from a "buffered" device. For example, electrical current may be prevented from flowing to the high voltage bus from the low voltage bus via DC/DC converter 281. Alternatively, electrical current may be prevented from flowing to the low voltage bus from the high voltage bus via the DC/DC converter 281.

BISG 219, starter 96, DC/DC converter 281, diode 304, and low voltage battery 280 are all directly electrically coupled to low voltage bus 273. Electric energy storage device 275, DC/DC converter 281, and some devices shown in FIG. 2 are directly electrically coupled to high voltage bus 274.

In power system 300, diode 304 prevents electrical current from flowing from ultra-capacitor and buffered low voltage electrical load 312 (e.g., entertainment systems, electric steering systems, air conditioning and heating systems, etc.) to low voltage bus 273. Diode 304 allows electrical current to flow to ultra-capacitor 310 and auxiliary low voltage loads 312 from low voltage bus 273 when a voltage of low voltage bus is greater than a voltage of ultra-capacitor 310. Ultra-capacitor or super capacitor 310 may be comprised of carbon electrodes with electrostatic double-layer capacitance that separates charge via a Helmholtz layer. Diode 304 is biased such that anode 304a is directly coupled to low voltage bus 273 and cathode 304b is directly coupled to ultra-capacitor 310.

DC/DC converter 281 may transfer electrical charge from electric energy storage device 275 and high voltage bus 274 to low voltage bus 273, thereby providing electrical power to BISG 219, starter 96, low voltage electric power consumers 310 (e.g., vehicle lights, window motors, etc.), ultra-capacitor 310, buffered low voltage electrical loads 312, and low voltage battery 280. In addition, one or more switches 330 may decoupled low voltage electric power consumers 310 from low voltage bus when commanded to do so via controller 12 or vehicle system controller 255.

Thus, the system of FIGS. 1-3 provide for a vehicle electric power system, comprising: a high voltage electric energy storage device electrically coupled to a high voltage bus; a low voltage electric energy storage device electrically coupled to a low voltage bus; a DC/DC converter electrically coupled to the high voltage buss and the low voltage bus; an ultra-capacitor buffered from the low voltage bus via a diode; and a controller including executable instructions stored in non-transitory memory that cause the controller to shed one or more electrical loads from the low voltage bus in response to a current limit of the DC/DC converter. The vehicle electric power system includes where the current limit is a function of a state of charge of the high voltage electric energy storage device. The vehicle system includes where the current limit is a function of a state of a temperature of the high voltage electric energy storage device. The vehicle system further comprises additional instructions that cause the controller to shed one or more electrical loads from the low voltage bus in response to an electrical current output capacity of the low voltage electric energy storage device. The vehicle system includes where the output capacity of the low voltage electric energy storage device is a function of a state of charge of the low voltage electric energy storage device. The vehicle system includes where the output capacity of the low voltage electric energy storage device is a function of a temperature of the low voltage electric energy storage device. The vehicle system further comprises additional instructions to adjust the output voltage of the DC/DC converter in response to an amount of time to rotate the engine a predetermined angular distance.

Figure 5:
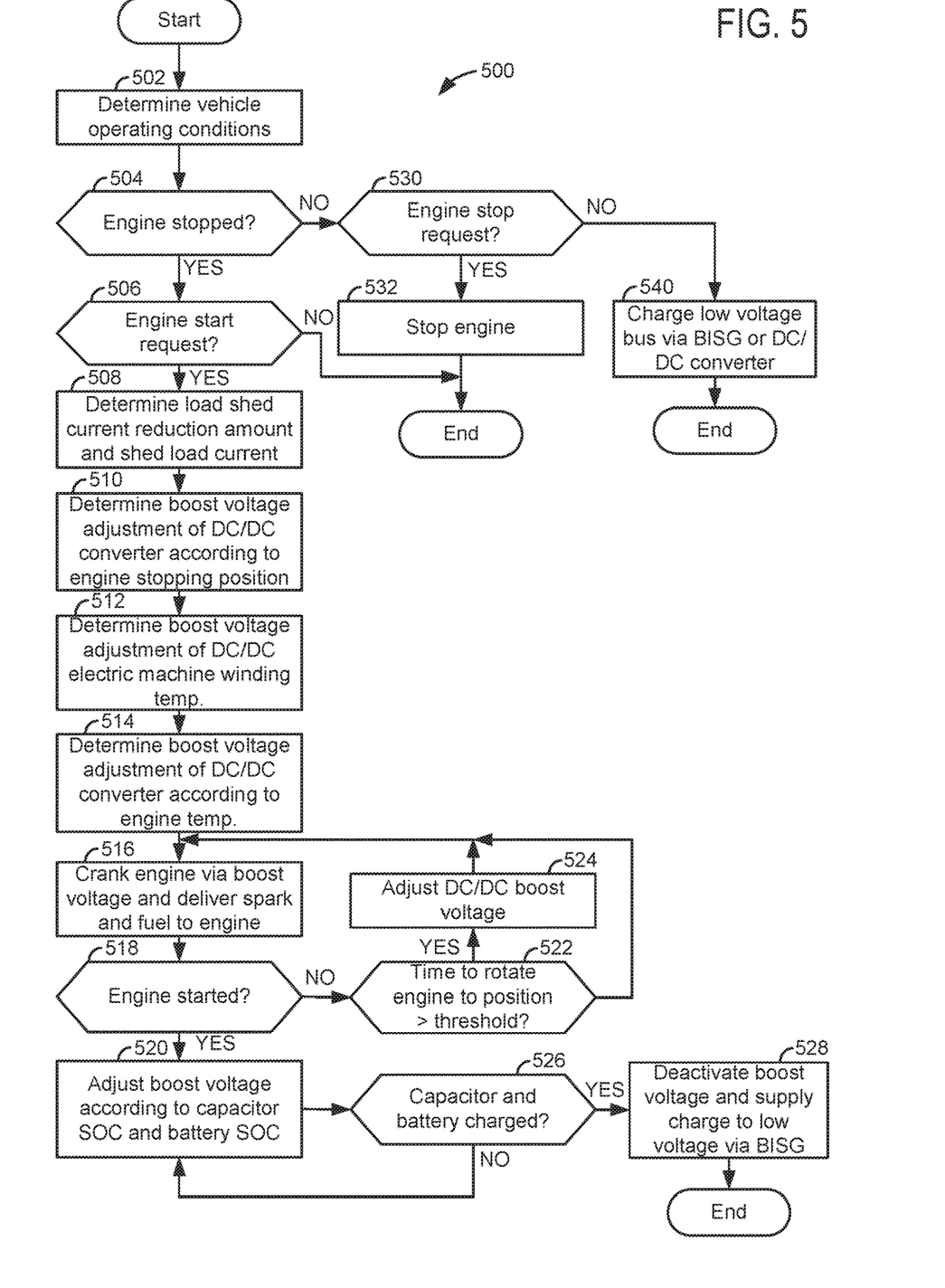
FIG. 5 shows a flowchart of a method for operating a DC/DC converter and a vehicle.
Figure 6:
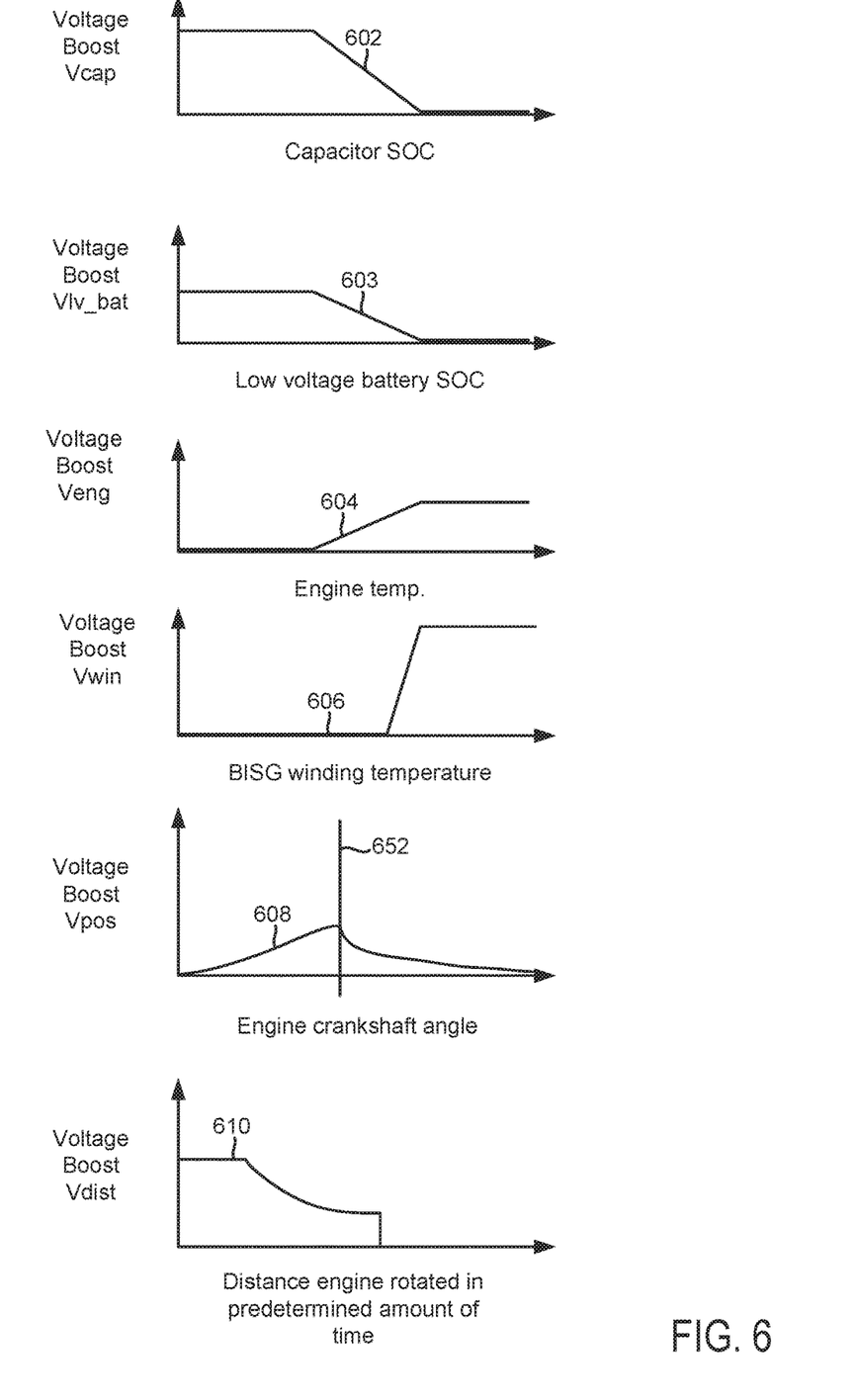
FIG. 6 shows example functions that form a basis for adjusting a voltage supplied to a low voltage bus via a DC/DC converter.

Referring now to FIG. 4, a vehicle operating sequence according to the method of FIG. 5 is shown. The vehicle operating sequence of FIG. 4 may be provided via the system of FIGS. 1-3 in cooperation with the method of FIG. 5. The plots shown in FIG. 4 are time aligned and occur at the same time. The vertical lines represent times of interest during the sequence. The SS marks along the horizontal axis represent breaks in time and the breaks may be short or long in duration.

The first plot from the top of FIG. 4 is a plot of voltage of a low voltage bus (e.g., 274) versus time. The vertical axis represents the voltage of the low voltage bus and the voltage increases in the direction of the vertical axis arrow. The horizontal axis represents time and time increases from the left side of the figure to the right side of the figure. Trace 402 represents the voltage of the low voltage bus.

The second plot from the top of FIG. 4 is a plot of ultra-capacitor SOC versus time. The vertical axis represents the ultra-capacitor SOC and the ultra-capacitor SOC increases in the direction of the vertical axis arrow. The horizontal axis represents time and time increases from the left side of the figure to the right side of the figure. Trace 404 represents the ultra-capacitor SOC.

The third plot from the top of FIG. 4 is a plot of an electrical load shed request versus time. The vertical axis represents the electrical load shed request and the electrical load shed request is asserted or activated when trace 406 is near the vertical axis arrow. The electrical load shed request is not activated when trace 406 is near the horizontal axis. The horizontal axis represents time and time increases from the left side of the figure to the right side of the figure. Trace 406 represents the electrical load shed request.

The fourth plot from the top of FIG. 4 is a plot of an electrical load shed current reduction amount (e.g., an amount of electrical current exiting the low voltage bus that is no longer exiting the low voltage bus) versus time. The vertical axis represents the electrical load shed current reduction amount and the electrical load shed current reduction amount increases in the direction of the vertical axis arrow. The horizontal axis represents time and time increases from the left side of the figure to the right side of the figure. Trace 408 represents the electrical load shed current reduction amount.

The fifth plot from the top of FIG. 4 is a plot of an amount of time that it takes to rotate the engine a predetermined angular distance versus time. The vertical axis represents the amount of time that it takes to rotate the engine a predetermined angular distance and the amount of time that it takes to rotate the engine a predetermined angular distance increases in the direction of the vertical axis arrow. The horizontal axis represents time and time increases from the left side of the figure to the right side of the figure. Line 450 represents a threshold amount of time to rotate the engine a predetermined angular distance. If the amount of time to rotate the engine is greater than or above line 450, then the BISG 219 is rotating the engine too slow and DC/DC voltage output to the low voltage bus may be increased to increase the torque output of BISG 219. If the amount of time to rotate the engine is less than or below line 450, then the BISG 219 is rotating the engine an insufficient distance within the allotted time. Measuring the distance traveled in a specified amount of time may be more informative than assessing the rotational speed of the engine because rotating the engine a specified distance within an amount of time may indicate that the engine has traveled through parts of one or more specific strokes (e.g., compression, intake, etc.), which may cause engine rotational speed to vary and distort BISG performance. Trace 410 indicates the amount of time it takes to rotate the engine a predetermined angular distance.

The sixth plot from the top of FIG. 4 is a plot of engine speed versus time. The vertical axis represents the engine speed and engine speed increases in the direction of the vertical axis arrow. The horizontal axis represents time and time increases from the left side of the figure to the right side of the figure. Trace 412 represents engine speed. Horizontal line 452 represents a requested engine cranking speed (e.g., 250 RPM).

The seventh plot from the top of FIG. 4 is a plot of an engine start/run request versus time. The vertical axis represents the state of the engine start/run request and the engine start request is asserted when trace 414 is at a higher level near the vertical axis arrow. The engine start/run request is not asserted when trace 414 is at a lower level near the horizontal axis. The engine may be attempted to start and/or the engine may be running when the engine start/run request is asserted. The engine is stopped or commanded to stop when the engine start/run request is not asserted. The horizontal axis represents time and time increases from the left side of the figure to the right side of the figure. Trace 414 represents the engine start/run request state.

At time t0, the engine is off (e.g., not combusting fuel and not rotating) and the engine start request is not asserted. The voltage of the low voltage bus is at a nominal voltage of the low voltage bus battery (e.g., 12 VDC). The SOC of the ultra-capacitor is at a higher level and an electrical load shed request is not asserted. The electrical load shed current reduction amount is zero and the time to rotate the engine a predetermined distance is not indicated. The engine speed is zero.

At time t1, a request to start the engine is indicated. The engine start request may be generated via a human or autonomous driver. The DC/DC converter is commanded to boost the voltage of the low voltage bus before the engine is rotated, or alternatively, while the engine is rotating so that the BISG may have sufficient torque to rotate the engine at the requested engine cranking speed (e.g., 250 RPM). The voltage that is output via the DC/DC converter may be a function of and based on BISG winding temperature, engine oil temperature, and cylinder head temperature. The voltage output from the DC/DC converter is greater than a voltage of the low voltage battery that is directly coupled to the low voltage bus so that the DC/DC converter may boost the voltage of the low voltage bus. The voltage boost provided via the DC/DC converter is expected to sufficient to allow the torque that is output from the BISG to rotate the engine a predetermined angular distance in a predetermined amount of time. The engine speed begins to increase shortly after time t1 as the BISG (not shown) begins to rotate the engine. In addition, shedding of electrical loads from the low voltage bus is requested so that a greater portion of DC/DC converter output current and voltage may be supplied to the BISG so that BISG torque may be increased. The amount of electrical load shedding is a higher level, which may be a function of electrical current output capacity of the low voltage battery 280 and other parameters. The amount of time to rotate the engine a predetermined angular distance is not indicated and the engine start/run request remains asserted.

At time t2, the engine has rotated a predetermined angular distance and the amount of time to rotate the predetermined angular distance is indicated to be above threshold 450. Therefore, the output voltage of the DC/DC converter is increased so that the voltage that is applied to the BISG and the low voltage bus increases. The ultra-capacitor SOC remains unchanged and the electrical load shed request remains asserted. The amount of electrical current that is shed from the low voltage bus is unchanged. The engine speed begins to increase since torque output of the BISG is increased. The engine start/run request remains asserted.

At time t3, the engine has accelerated to a threshold speed (e.g., engine idle speed) and the voltage output from the DC/DC converter is reduced in response thereto. In addition, the voltage output of the DC/DC converter is reduced to a voltage that is a function of the ultra-capacitor SOC. Since the SOC of the ultra-capacitor is rather high, the output voltage of the DC/DC converter is decreased to a level that is slightly greater than the voltage level of the low voltage battery 280. The load shed request is withdrawn and the load shed current reduction amount is reduced to zero. By withdrawing the electrical load shed request, low voltage electrical loads may be powered via the low voltage battery 280 and DC/DC converter 281. A break in the sequence is indicated between time t3 and time t10.

At time t10, the engine is off (e.g., not combusting fuel and not rotating) and the engine start request is not asserted. The voltage of the low voltage bus is at a nominal voltage of the low voltage bus battery (e.g., 12 VDC). The SOC of the ultra-capacitor is low and an electrical load shed is not being requested. The electrical load shed electrical current reduction amount is zero and the amount of time to rotate the engine a predetermined angular distance is not indicated. The engine speed is zero and the engine start/run request is not asserted.

At time t11, a request to start the engine is indicated. The engine start request may be generated via a human or autonomous driver. The DC/DC converter is commanded to boost the voltage of the low voltage bus before the engine is rotated, or alternatively, while the engine is rotating so that the BISG may have sufficient torque to rotate the engine a predetermined angular distance in a predetermined amount of time (e.g., 500 crankshaft degrees in one second). The voltage that is output via the DC/DC converter may be a function of and based on BISG winding temperature, engine oil temperature, and cylinder head temperature. The voltage output from the DC/DC converter is greater than a voltage of the low voltage battery that is directly coupled to the low voltage bus so that the DC/DC converter may boost the voltage of the low voltage bus and the voltage that is applied to the BISG. The voltage boost provided via the DC/DC converter is expected to sufficient to allow the torque that is output from the BISG to rotate the engine a predetermined angular distance in a predetermined amount of time. The engine speed begins to increase shortly after time t11 as the BISG (not shown) begins to rotate the engine. In addition, shedding of electrical loads from the low voltage bus is requested so that a greater portion of DC/DC converter output current and voltage may be supplied to the BISG so that BISG torque may be increased. The amount of electrical load shedding is a lower level, which may be a function of electrical current output capacity of the low voltage battery 280 and other parameters. The amount of time to rotate the engine a predetermined angular distance is not indicated and the engine start/run request remains asserted.

At time t12, the engine has rotated a predetermined angular distance and the amount of time to rotate the predetermined angular distance is indicated to be below threshold 450. Therefore, the output voltage of the DC/DC converter is held at its present level. Alternatively, output voltage of the DC/DC converter may be reduced when the amount of time to rotate the engine the predetermined distance is short. The ultra-capacitor SOC increases a small amount and the electrical load shed request remains asserted. The amount of electrical current that is shed from the low voltage bus is unchanged. The engine speed remains at its previous level and the engine start/run request remains asserted.

At time t13, the engine has accelerated to a threshold speed (e.g., engine idle speed) and the voltage output from the DC/DC converter is reduced in response thereto. In addition, the voltage output of the DC/DC converter is increased to a voltage that is a function of the ultra-capacitor SOC and the electrical load that is being added to the low voltage bus via eliminating the electrical load shedding. Since the SOC of the ultra-capacitor is rather low, the output voltage of the DC/DC converter is not decreased further. The SOC of the ultra-capacitor continues to increase. The load shed request is withdrawn and the load shed current reduction amount is reduced to zero. By withdrawing the electrical load shed request, low voltage electrical loads may be powered via the low voltage battery 280 and DC/DC converter 281.

In this way, an output voltage of a DC/DC converter may be adjusted to adjust torque output of an electric machine so that engine starting timing may be improved. The DC/DC converter output voltage that is applied to the low voltage bus may be increased or decreased based on the amount of time it takes the engine to rotate a predetermined distance. Further, the output voltage of the DC/DC converter may be adjusted according to an engine stopping position such that when torque to turn the engine is expected to be higher, output voltage of the DC/DC converter may be increased. When torque to turn the engine is expected to be lower, output voltage of the DC/DC converter may be decreased to conserve energy. Additionally, the output voltage of the DC/DC converter may be adjusted to improve charging of the low voltage battery and ultra-capacitor.

Referring now to FIG. 5, a method for operating a vehicle is shown. At least portions of method 500 may be implemented as executable controller instructions stored in non-transitory memory. Method 500 may operate in cooperation with the system of FIGS. 1-3. Additionally, portions of method 500 may be actions taken in the physical world to transform an operating state of an actuator or device. The method of FIG. 5 may be incorporated into the system of FIGS. 1-3 as executable instructions stored in non-transitory memory.

At 502, method 500 determines vehicle operating conditions. Vehicle operating conditions may include but are not limited to engine speed, BISG winding temperature, engine oil temperature, engine cylinder head temperature, engine stop position, and voltage of the low voltage bus. The vehicle operating conditions may be determined via the sensors and actuators that are described herein. Method 500 proceeds to 504.

At 504, method 500 judges if the engine is stopped. Method 500 may judge that the engine is stopped if the engine is not rotating. If method 500 judges that the engine is stopped, the answer is yes and method 500 proceeds to 506. Otherwise, the answer is no and method 500 proceeds to 530.

At 506, method 500 judges if there is an engine start request. Method 500 may judge that there is an engine start request if a human, controller, or autonomous driver is requesting that an engine be started. The engine start request may be input to a human/machine interface or it may be generated via a controller responsive to vehicle operating conditions (e.g., accelerator pedal position and brake pedal position). If method 500 judges that the engine start is requested, the answer is yes and method 500 proceeds to 508. Otherwise, the answer is no and method 500 proceeds to exit.

At 508, method 500 determines an amount of electrical current to load shed from the low voltage bus. Electrical current may be load shed from the low voltage bus via opening a switch and disconnecting low voltage electrical loads from the low voltage bus. For example, a window defroster may be decoupled from the low voltage bus to reduce electric current that is drained from the low voltage bus. Electrical loads that are shed from the low voltage bus may include but are not limited to vehicle lights, entertainment systems, window motors, door locks, DC to AC inverters. The electrical loads may be individually disconnected from the low voltage bus so that electrical current drawn from the low voltage bus is less than a threshold amount of current. In one example, the amount of load shed current reduction may be expressed as:

$$I_{load\_cap} = f1(DCDC_{I\_lim}) + f2(L_{Bat\_SOC}, L_{Bat\_temp}, L_{Bat\_age})$$

$$I_{Load\_shed} = I_{load\_cap} - I_{BISG\_rot} - I_{res} - I_{Lv\_loads}$$

where $I_{load\_cap}$ is the current capacity of the low voltage bus, f1 is a function that returns a current output capacity of the DC/DC converter to the low voltage bus, $DCDC_{I\_lim}$ is an input current limit to the DC/DC converter 281 that is a function of the high voltage battery SOC, high voltage battery temperature, high voltage battery age, and electrical loads that are applied to the high voltage battery, f2 is a function that returns a current output capacity of the low voltage battery 280, $L_{Bat\_SOC}$ is the low voltage battery SOC, $L_{Bat\_temp}$ is the low voltage battery temperature, and $L_{Bat\_age}$ is an aging factor for the low voltage battery. $I_{Load\_shed}$ is the amount of electrical current that is to be load shed or removed from the low voltage bus during engine cranking, $I_{BISG\_rot}$ is an amount of current expected to be used by the BISG to rotate the engine a predetermined angular distance in a threshold amount of time, $I_{res}$ is a current reserve for the low voltage bus, and ILV_loads is an amount of current that is being supplied to presently activated low voltage loads that are applied to the low voltage bus. If a value of $I_{Load\_shed}$ is negative, the negative amount of electrical current is load shed or removed from the low voltage bus via decoupling one or more low voltage electrical loads from the low voltage bus. For example, if $I_{Load\_shed} = -20$ amperes, where $I_{Load\_cap} = 200$, $I_{BISG\_rot} = 175$ ampers, $I_{res} = 20$ amperes, and $I_{LV\_loads} = 25$ amperes, then a load shed of 20 amperes (e.g., the absolute value of the −20 amperes) is requested and 5 amperes is made available to low voltage loads. If the low voltage electrical loads that make up the 25 amperes of electrical current supplied to low voltage electrical loads include a window defroster using 20 amperes and an entertainment system using 5 amperes, then the window defroster may be decoupled from the low voltage bus when the engine is being cranked and low voltage load shedding is requested. If the value of $I_{Load\_shed}$ is zero or positive, no electrical loads are shed from the low voltage bus. Method 500 sheds electrical loads from the low voltage bus and proceeds to 510.

At 510, method 500 adjusts a boost voltage of the DC/DC converter according to an engine stopping position. In one example, method 500 adjusts a voltage boost amount provided via the DC/DC converter to the low voltage bus as a function of the position or crankshaft angle at which the engine most recently stopped. For example, as shown in FIG. 6, the output of the DC/DC converter may be adjusted in response to a crankshaft angle at which the engine most recently stopped. The engine's crankshaft angle may be measured relative to top-dead-center compression stroke of cylinder number one and the crankshaft angle may have a range of 0-719 degrees for a four stroke engine.

The value of the engine position based boost voltage adder (Vpos) may increase and decrease as a function of the crankshaft angle at which the engine stops. For example, if the engine is a single cylinder engine and the engine stops near top-dead-center compression stroke of the cylinder, the expected cranking torque to begin engine rotation may be higher since the cylinder is compressing an air charge. However, if the engine is stopped after top-dead-center compression stroke and during an expansion stroke, then the expected cranking torque may be lower since the cylinder is expanding, depending on the amount of time the engine has not rotated. FIG. 6 shows one example of DC/DC voltage boost as a function of a most recent engine stopping position or crankshaft angle. Method 500 determines the engine stopping position based boost voltage adjustment via indexing or referencing a table or function and proceeds to 512.

At 512, method 500 determines the boost voltage increase of the DC/DC converter based on BISG winding temperature. Higher electric machine winding temperatures may be indicative of high winding resistance and higher winding resistance may lead to lower current flow through the electric machine. Lower current flow through the electric machine may reduce electric machine torque output, thereby reducing engine cranking speed. Method 500 determines the boost voltage Vwin for the present electric machine winding temperature via indexing or referencing a function as shown in FIG. 6 and proceeds to 514.

At 514, method 500 determines boost voltage increases for the DC/DC converter based on engine temperature. In one example, method 500 may adjust a boost voltage of the DC/DC converter according to an engine cylinder head temperature. Specifically, method 500 adjusts a boost amount provided via the DC/DC converter to the low voltage bus as a function of the present engine temperature (e.g., cylinder head temperature) according to an empirically determined function as shown in FIG. 6. Engine temperature may be indicative of an amount of torque that is required to rotate an engine. For some engines, higher engine temperatures may indicate that a greater amount of torque may be needed to rotate the engine at a requested engine cranking speed. Lower engine temperatures may indicate that a smaller amount of torque may be needed to rotate the engine at the requested engine cranking speed. FIG. 6 shows one example of DC/DC voltage boost as a function of engine temperature. Method 500 determines the boost voltage Veng for the present engine temperature via referencing a table or function stored in memory and proceeds to 514.

Alternatively, or in addition, method 500 may adjust a boost voltage of the DC/DC converter according to a different engine temperature (e.g., an engine oil temperature). In one example, method 500 adjusts a boost voltage amount provided via the DC/DC converter to the low voltage bus as a function of the present engine oil temperature. Engine oil temperature may be indicative of an amount of torque that is required to rotate an engine. For some engines, higher engine oil temperatures may indicate that a greater amount of torque may be needed to rotate the engine at a requested engine cranking speed. Lower engine oil temperatures may indicate that a smaller amount of torque may be needed to rotate the engine at the requested engine cranking speed.

At 516, method 500 cranks the engine via the BISG. The engine may be cranked via electrical energy that is supplied via the DC/DC converter. Therefore, method 500 sums all the boost voltages and outputs the boost voltage via the DC/DC converter to the low voltage bus to raise the voltage of the low voltage bus. In one example, the DC/DC converter boost voltage is comprised of a base voltage (e.g., 12 VDC) and a plurality of adder voltages that may be expressed as:

$$Vboost=Vbase+Vpos+Veng+Vwin$$

where Vboost is a variable representing the final boost voltage that is output from the DC/DC converter to the low voltage bus, Vbase is a variable that represents a base boost voltage (e.g., 12 VDC), Vpos is a variable that represents an engine position based boost voltage adder, Veng is a variable that represents an engine temperature based boost voltage adder, and Vwin is a variable that represents an electric machine winding temperature based boost voltage adder.

If all the boost voltage adder values other than Vbase add up to zero, the DC/DC converter may not output a boost voltage. The boost voltage may be output to the low voltage bus before the engine is rotated and while the engine is stopped so that the BISG or starter is exposed to the boost voltage for the early portion of the engine cranking sequence. As such, torque output via the BISG or starter may be uniform during the engine cranking sequence so that engine speed variation during engine cranking may be minimized, thereby improving customer satisfaction. Alternatively, method 500 may output the boost voltage at the same time engine cranking begins, or shortly thereafter, to avoid the possibility of delaying engine cranking. Some customers may prefer a quick response to an engine start request and simultaneously cranking the engine and boosting voltage of the low voltage bus may increase their product satisfaction. Method 500 attempts to rotate the engine a predetermined distance in a predetermined amount of time by applying boost voltage to the BISG and rotating the engine via the BISG. Method 500 also supplies spark and fuel to the engine to start the engine. Method 500 proceeds to 518.

At 518, method 500 judges if the engine is started. In one example, method 500 may judge that the engine is started when a speed of the engine reaches engine idle speed (e.g., 600 RPM). If method 500 judges that the engine has started, the answer is yes and method 500 proceeds to 520. In addition, method 500 may exit if the engine has been cranked for a threshold amount of time without the engine starting. If method 500 judges that the engine is not started, the answer is no and method 500 proceeds to 522.

At 522, method 500 judges if the amount of time it takes to rotate the engine a predetermined number of engine crankshaft degrees is greater than a threshold amount of time. If so, the answer is yes and method 500 proceeds to 524. Otherwise, the answer is no and method 500 returns to 516.

At 524, method 500 adjusts the boost voltage of the DC/DC converter to rotate the engine faster. In one example, the DC/DC boost voltage is adjusted as a function of the amount of time it took the BISG to rotate the engine the predetermined number of engine crankshaft degrees. For example, if it took the BISG 0.2 seconds longer than expected to rotate the engine the predetermined number of crankshaft degrees, then DC/DC boost voltage may be increased by 0.5 volts. Method 500 returns to 516.

At 520, method 500 adjusts the DC/DC converter boost voltage that is applied to the low voltage bus according to a SOC of the ultra-capacitor and SOC of the low voltage battery that is coupled to the low voltage bus. The SOC of the ultra-capacitor and low voltage battery may be determined via measuring voltages of the ultra-capacitor and the low voltage battery and counting coulombs as is known in the art. In one example, the boost voltage of the DC/DC converter that is based on ultra-capacitor SOC (Vcap) may be adjusted as a function of ultra-capacitor SOC as shown in FIG. 6. In addition, the boost voltage of the DC/DC converter may be adjusted as a function of the low voltage battery voltage as shown in FIG. 6. The DC/DC converter output voltage may be adjusted up or down based on a value Vlv_bat. Method 500 also removes the electrical load shedding and recouples low voltage electrical loads to the low voltage bus. Method 500 proceeds to 526.

At 526, method 500 judges if the ultra-capacitor and the low voltage battery are charged to desired levels. If so, the answer is yes and method 500 proceeds to 528. Otherwise, the answer is no and method 500 returns to 520.

At 528, method 500 deactivates the boost voltage from the DC/DC converter (e.g., reduces the boost voltage to zero) and supplies charge to the low voltage bus via the BISG. In other words, the BISG switches from operating as a motor to operating as a generator. Method 500 proceeds to exit.

At 530, method 500 judges if an engine stop has been requested. An engine stop may be requested via a human, a controller, or via an autonomous driver. If method 500 judges that an engine stop has been requested, the answer is yes and method 500 proceeds to 532. Otherwise, the answer is no and method 500 proceeds to 540.

At 532, method 500 stops engine rotation by ceasing fuel and spark delivery to the engine. Method 500 proceeds to exit.

At 540, method 500 supplies electric charge to the low voltage bus via the BISG to power electric devices that are electrically coupled to the low voltage bus and to charge electric energy storage devices that are electrically coupled to the low voltage bus. Alternatively, method 500 may supply electrical charge to the low voltage bust via the DC/DC converter. Method 500 proceeds to exit.

Thus, the method of FIG. 5 provides for a vehicle operating method, comprising: adjusting an output voltage of a DC/DC converter directly electrically coupled to a low voltage bus and supplying electrical power to the low voltage bus via the DC/DC converter in response to an engine start request; cranking the engine via an electric machine, the electric machine directly electrically coupled to the low voltage bus; and adjusting the output voltage of the DC/DC converter in response to a state of charge of a ultra-capacitor directly coupled to buffered electrical vehicle loads in response to completion of the cranking of the engine. The method includes where the buffered electrical vehicle loads are buffered via a diode, and where the ultra-capacitor is directly electrically coupled to a cathode of the diode. The method includes where cranking of the engine is complete when engine speed is greater than a threshold speed. The method further comprises adjusting the output voltage of the DC/DC converter in response to a state of charge (SOC) of a battery that is directly electrically coupled to the low voltage bus. The method further comprises adjusting the output voltage of the DC/DC converter in response to an engine temperature while the engine is stopped. The method includes where the adjusting of the output voltage of the DC/DC converter in response to the engine start request includes adjusting output voltage of the DC/DC converter before cranking the engine. The method includes where adjusting the output voltage of the DC/DC converter in response to the state of charge includes applying a first voltage to the low voltage bus via the DC/DC converter in response to the state of charge of the ultra-capacitor being greater than a first threshold and applying a second voltage to the low voltage bus via the DC/DC converter in response to the state of charge of the ultra-capacitor being less than the second threshold, the first voltage being less than the second voltage.

The method of FIG. 5 also provides for a vehicle operating method, comprising: adjusting an output voltage of a DC/DC converter directly electrically coupled to a low voltage bus and supplying electrical power to the low voltage bus via the DC/DC converter in response to an engine start request; shedding one or more electrical loads applied to the low voltage bus as a function of a state of charge of a high voltage battery in response to the engine start request, the high voltage battery electrically coupled to the DC/DC converter; and cranking the engine via an electric machine, the electric machine directly electrically coupled to the low voltage bus. The method further comprises shedding the one or more electrical loads as a function of a state of charge of a low voltage battery, and where the low voltage battery is electrically coupled to the low voltage bus. The method further comprises shedding the one or more electrical loads as a function of electrical loads coupled to a high voltage bus. The method further comprises shedding the one or more electrical loads as a function of a temperature of a low voltage battery. The method further comprises adjusting the output voltage of the DC/DC converter in response to an amount of time to rotate the engine a predetermined distance. The method further comprises adjusting the output voltage of the DC/DC converter in response to a temperature of windings of an electric machine.

Referring now to FIG. 6, six plots are shown. The six plots represent example relationships or transfer functions that may be stored in controller read-only memory or in controller random access memory. The functions shown in FIG. 6 are provided to simply show the relationships between variables and are not intended to limit the scope of this disclosure. In addition, the relationships shown in FIG. 6 may be different for different engines and BISGs.

The first plot from the top of FIG. 6 is a plot of a DC/DC converter voltage boost adder function that returns a value of Vcap when the function is referenced via ultra-capacitor SOC. The vertical axis represents the variable Vcap and the value of Vcap increases in the direction of the vertical axis arrow. The horizontal axis represents ultra-capacitor SOC and ultra-capacitor SOC increases in the direction of the horizontal axis arrow. Line 602 represents a relationship between a DC/DC voltage boost adder Vcap and ultra-capacitor SOC. In this example, the value of Vcap increases for lower ultra-capacitor SOC values and it is reduced or lowered for higher ultra-capacitor SOC values. Thus, relationship 602 provides a boost voltage increase for the DC/DC converter that may improve ultra-capacitor charging after engine cranking is complete. The relationship 602 may be determined via applying different voltages to the ultra-capacitor and determining desired current flow rates between the DC/DC converter and the ultra-capacitor.

The second plot from the top of FIG. 6 is a plot of a DC/DC converter voltage boost adder function that returns a value of Vlv_bat when the function is referenced via low voltage battery voltage. The vertical axis represents the variable Vlv_bat and the value of Vlv_bat increases in the direction of the vertical axis arrow. The horizontal axis represents low voltage battery voltage and low voltage battery voltage increases in the direction of the horizontal axis arrow. Line 603 represents a relationship between a DC/DC voltage boost adder Vlv_bat and low voltage battery voltage. In this example, the value of Vlv_bat increases for lower low voltage battery voltages and it is reduced or lowered for higher low voltage battery voltage values. Thus, relationship 603 provides a boost voltage increase for the DC/DC converter that may improve low voltage battery charging after engine cranking is complete. The relationship 603 may be determined via applying different voltages to the low voltage battery and determining desired current flow rates between the DC/DC converter and the low voltage battery.

The third plot from the top of FIG. 6 is a plot of a DC/DC converter voltage boost adder function that returns a value of Veng when the function is referenced via an engine temperature. The vertical axis represents the variable Veng and the value of Veng increases in the direction of the vertical axis arrow. The horizontal axis represents engine temperature and engine temperature increases in the direction of the horizontal axis arrow. Line 604 represents a relationship between a DC/DC voltage boost adder Veng and engine temperature. In this example, the value of Veng increases as engine temperature increases and then Veng levels off at higher engine temperatures. Consequently, for this example, the voltage boost adder is increased at higher engine temperatures so that BISG torque output may be increased for higher engine temperatures. Torque to crank the engine when the engine's temperature is higher may increase for some engines. Thus, relationship 604 provides a boost voltage increase that may improve the possibility of engine rotation meeting a desired distance even when engine temperature varies. The relationship 604 may be determined via stopping an engine at different engine temperatures and adjusting DC/DC converter output voltage for the different engine temperatures and recording DC/DC converter output voltages that cause the BISG to rotate the engine a desired distance in a threshold amount of time.

The fourth plot from the top of FIG. 6 is a plot of a DC/DC converter voltage boost adder function that returns a value of Vwin when the function is referenced via BISG winding temperature. The vertical axis represents the variable Vwin and the value of Vwin increases in the direction of the vertical axis arrow. The horizontal axis represents BISG winding temperature and BISG winding temperature increases in the direction of the horizontal axis arrow. Line 606 represents a relationship between a DC/DC voltage boost adder Vwin and BISG winding temperature. In this example, the value of Vwin increases as BISG winding temperature increases and then Vwin levels off at higher BISG winding temperatures. Thus, for this example, the voltage boost adder is increased at higher BISG winding temperatures so that BISG torque output may be increased for higher BISG winding temperatures. Torque to crank the engine when the BISG's winding temperature is higher may increase. Thus, relationship 606 provides a boost voltage increase that may improve the possibility of engine cranking distance being greater than a threshold value in a predetermined amount of time. The relationship 606 may be determined via stopping an engine with different BISG winding temperatures and adjusting DC/DC converter output voltage for the different BISG winding temperatures and recording DC/DC converter output voltages that cause the BISG to rotate the engine the predetermined distance in a predetermined amount of time.

The fifth plot from the top of FIG. 6 is a plot of a DC/DC converter voltage boost adder function that returns a value of Vpos when the function is referenced via a most recent engine stopping position (e.g., crankshaft angle). The vertical axis represents the variable Vpos and the value of Vpos increases in the direction of the vertical axis arrow. The horizontal axis represents the most recent engine stopping position and engine stopping position is shown relative to top dead compression stroke of an engine cylinder; however, engine stopping position may be referenced to other engine positions if desired. Line 608 represents a relationship between a DC/DC voltage boost adder Vpos and a most recent engine stopping position. In this example, the value of Vpos increases as engine stopping position approaches top-dead-center compression stroke of the reference cylinder (e.g., cylinder number one) and Vpos decreases as engine stopping position is after top-dead-center compression stroke of the reference cylinder. Vertical line 652 represents top-dead-center compression stroke for the reference cylinder. Thus, for this example, the voltage boost adder is increased as engine stopping position approaches top-dead-center compression stroke of the reference cylinder so that BISG torque output may be increased when higher pressures in the engine cylinders may be expected. Thus, relationship 608 provides a boost voltage increase that may improve the possibility of engine cranking speed matching a requested engine cranking speed, even when a most recent engine stopping position varies. The relationship 608 may be determined via stopping an engine at different engine crankshaft angles and adjusting DC/DC converter output voltage for the different engine crankshaft angles and recording DC/DC converter output voltages that cause the BISG to rotate the engine at a requested engine cranking speed.

The sixth plot from the top of FIG. 6 is a plot of a DC/DC converter voltage boost adder function that returns a value of Vdist when the function is referenced via a distance that the engine has rotated in a predetermined amount of time since the most recent time the engine began to be cranked via a starter or BISG. The vertical axis represents the variable Vdist and the value of Vdist is greater when the engine rotates a shorter distance in the predetermined amount of time. The value of Vdist is smaller when the engine rotates farther in the predetermined amount of time. The horizontal axis represents the distance that the engine rotated in the predetermined amount of time and the distance increases in the direction of the horizontal axis arrow. Line 610 represents a relationship between a DC/DC voltage boost adder Vdist and the distance the engine rotated in the predetermined amount of time. Thus, relationship 610 provides a boost voltage increase to the low voltage bus via the DC/DC converter when the distance the engine rotates in the threshold amount of time is lower.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
adjusting an output voltage of a DC/DC converter directly electrically coupled to a low voltage bus and supplying electrical power to the low voltage bus via the DC/DC converter in response to an engine start request, where the output voltage in response to the engine start request is adjusted based on a position that an engine most recently stopped;
shedding one or more electrical loads applied to the low voltage bus as a function of a state of charge of a high voltage battery in response to the engine start request, the high voltage battery electrically coupled to the DC/DC converter;
cranking the engine via an electric machine, the electric machine directly electrically coupled to the low voltage bus; and
adjusting the output voltage of the DC/DC converter in response to a state of charge of an ultra-capacitor directly coupled to buffered electrical vehicle loads in response to completion of the cranking of the engine.

2. The method of claim 1, where the buffered electrical vehicle loads are buffered via a diode, and where the ultra-capacitor is directly electrically coupled to a cathode of the diode.

3. The method of claim 1, where cranking of the engine is complete when engine speed is greater than a threshold speed.

4. The method of claim 3, further comprising adjusting the output voltage of the DC/DC converter in response to a state of charge (SOC) of a battery that is directly electrically coupled to the low voltage bus.

5. The method of claim 1, wherein the output voltage in response to the engine start request is higher if the position that the engine most recently stopped was near a top-dead-center compression stroke than if the position that the engine most recently stopped was during an expansion stroke.

6. The method of claim 1, where the adjusting of the output voltage of the DC/DC converter in response to the engine start request includes adjusting output voltage of the DC/DC converter before cranking the engine.

7. The method of claim 1, where adjusting the output voltage of the DC/DC converter in response to the state of charge includes applying a first voltage to the low voltage bus via the DC/DC converter in response to the state of charge of the ultra-capacitor being greater than a first threshold and applying a second voltage to the low voltage bus via the DC/DC converter in response to the state of charge of the ultra-capacitor being less than the first threshold, the first voltage being less than the second voltage.

8. A vehicle electric power system, comprising:
a low voltage electric energy storage device electrically coupled to a low voltage bus;
a DC/DC converter directly electrically coupled to the low voltage bus;
an ultra-capacitor buffered from the low voltage bus via a diode; and
a controller including executable instructions stored in non-transitory memory that cause the controller to:
adjust an output voltage of the DC/DC converter and supply electrical power to the low voltage bus via the DC/DC converter in response to an engine start request, where the output voltage in response to the engine start request is adjusted based on a position that the engine most recently stopped;
shed one or more electrical loads from the low voltage bus in response to the engine start request; and
cranking the engine via an electric machine, the electric machine directly electrically coupled to the low voltage bus.

9. The vehicle system of claim 8, further comprising additional instructions that cause the controller to shed one or more electrical loads from the low voltage bus in response to an electrical current output capacity of the low voltage electric energy storage device.

10. The vehicle system of claim 9, where the output capacity of the low voltage electric energy storage device is a function of a state of charge of the low voltage electric energy storage device.

11. The vehicle system of claim 9, where the output capacity of the low voltage electric energy storage device is a function of a temperature of the low voltage electric energy storage device.

12. The vehicle system of claim 8, further comprising additional instructions to adjust the output voltage of the DC/DC converter in response to an amount of time to rotate the engine a predetermined distance.

13. A vehicle operating method, comprising:
adjusting an output voltage of a DC/DC converter directly electrically coupled to a low voltage bus and supplying electrical power to the low voltage bus via the DC/DC converter in response to an engine start request, where the output voltage in response to the engine start request is adjusted based on a position that an engine most recently stopped;
shedding one or more electrical loads applied to the low voltage bus as a function of a state of charge of a high voltage battery in response to the engine start request, the high voltage battery electrically coupled to the DC/DC converter; and
cranking the engine via an electric machine, the electric machine directly electrically coupled to the low voltage bus.

14. The method of claim 13, further comprising shedding the one or more electrical loads as a function of a state of charge of a low voltage battery, and where the low voltage battery is electrically coupled to the low voltage bus.

15. The method of claim 13, further comprising shedding the one or more electrical loads as a function of electrical loads coupled to a high voltage bus.

16. The method of claim 13, further comprising shedding the one or more electrical loads as a function of a temperature of a low voltage battery.

17. The method of claim 13, further comprising adjusting the output voltage of the DC/DC converter in response to an amount of time to rotate the engine a predetermined distance.

18. The method of claim 13, further comprising adjusting the output voltage of the DC/DC converter in response to a temperature of windings of an electric machine.

* * * * *